United States Patent
Konishi et al.

(10) Patent No.: US 11,040,906 B2
(45) Date of Patent: Jun. 22, 2021

(54) METHOD FOR MANUFACTURING OPTICAL FIBER

(71) Applicant: SUMITOMO ELECTRIC INDUSTRIES, LTD., Osaka (JP)

(72) Inventors: Tatsuya Konishi, Yokohama (JP); Iwao Okazaki, Yokohama (JP); Fumio Yoshimura, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 315 days.

(21) Appl. No.: 15/776,265

(22) PCT Filed: Nov. 2, 2016

(86) PCT No.: PCT/JP2016/082683
§ 371 (c)(1),
(2) Date: May 15, 2018

(87) PCT Pub. No.: WO2017/086175
PCT Pub. Date: May 26, 2017

(65) Prior Publication Data
US 2020/0199009 A1 Jun. 25, 2020

(30) Foreign Application Priority Data
Nov. 16, 2015 (JP) .............................. JP2015-223626

(51) Int. Cl.
*C03B 37/027* (2006.01)
(52) U.S. Cl.
CPC ...... *C03B 37/027* (2013.01); *C03B 37/02736* (2013.01)
(58) Field of Classification Search
CPC ...... C03B 37/025–0256; C03B 37/027; C03B 37/02736
See application file for complete search history.

(56) References Cited

U.S. PATENT DOCUMENTS

| 8,322,165 B2 | 12/2012 | Otosaka et al. |
| 2011/0265522 A1* | 11/2011 | Okada ............ C03B 37/029 65/424 |

(Continued)

FOREIGN PATENT DOCUMENTS

| CN | 104556677 A | 4/2015 |
| JP | 2011-084409 A | 4/2011 |

(Continued)

OTHER PUBLICATIONS

JP2015-074600—Google Machine Translation Performed May 28, 2020. (Year: 2020).*

(Continued)

*Primary Examiner* — Lisa L Herring
(74) *Attorney, Agent, or Firm* — Faegre Drinker Biddle & Reath LLP (57) ABSTRACT

In a method for manufacturing an optical fiber, a dummy rod is connected to a vicinity of an upper end of a glass preform which includes a diameter-reduced portion at an upper portion thereof, and the glass preform is heated to be melt in a drawing furnace to draw an optical fiber. A cap member is provided at a position of the diameter-reduced portion, and an upper end of the cap member is disposed close to a lower end of the dummy rod. When an orthogonal coordinate axis is set, in which an outer diameter ratio of the cap member to the glass preform is set as a horizontal axis x, and an outer diameter ratio of the dummy rod to the glass preform is set as a vertical axis y, the x and the y satisfy an expression $y \geq 0.1527 \times x^{-3.103}$.

3 Claims, 5 Drawing Sheets

(56) References Cited

U.S. PATENT DOCUMENTS

2015/0007616 A1   1/2015  Fujii
2016/0002090 A1*  1/2016  Okazaki ................ C03B 37/029
                                                         65/435

FOREIGN PATENT DOCUMENTS

JP       2014-162671 A       9/2014
JP        2015-74600 A       4/2015
WO    WO-2014129471 A1 *    8/2014   ....... C03B 37/02736

OTHER PUBLICATIONS

JP2015074611A—English Translation—Performed by Schreiber Translations Jun. 2020—30 pages. (Year: 2020).*

\* cited by examiner

METHOD FOR MANUFACTURING OPTICAL FIBER

TECHNICAL FIELD

The present invention relates to a method for manufacturing an optical fiber.

This application claims priority of Japanese Patent Application No. 2015-223626 filed on Nov. 16, 2015, the contents of which are incorporated herein by reference.

BACKGROUND ART

Patent Document 1 discloses a technique for providing stable sealing to a glass preform. Patent Document 2 discloses a technique for reducing fluctuation in gas flow in a drawing furnace.

PRIOR ART DOCUMENT

Patent Document

Patent Document 1: JP-A-2014-162671
Patent Document 2: JP-A-2015-74600

SUMMARY OF THE INVENTION

In a method for manufacturing an optical fiber according to the present disclosure, a dummy rod is connected to a vicinity of an upper end of a glass preform for optical fiber, the glass preform including a diameter-reduced portion at an upper portion thereof, and the glass preform is heated to be melted in a drawing furnace to draw the optical fiber, wherein a cap member is provided at a position of the diameter-reduced portion of the glass preform for optical fiber, and an upper end of the cap member is disposed close to a lower end of the dummy rod, and when an orthogonal coordinate axis is set, in which an outer diameter ratio of the cap member to the glass preform for optical fiber is set as a horizontal axis x, and an outer diameter ratio of the dummy rod to the glass preform for optical fiber is set as a vertical axis y, the outer diameter ratio x of the cap member and the outer diameter ratio y of the dummy rod satisfy an expression $y \geq 0.1527 \times x^{-3.103}$.

DESCRIPTION OF EMBODIMENTS

Problems to be Solved by the Disclosure

An optical fiber is drawn from below a drawing furnace by inserting a glass preform for optical fiber (hereinafter referred to as a glass preform) containing quartz as a main component into a furnace tube from above the drawing furnace for optical fiber (hereinafter referred to as a drawing furnace) and by heating to melt a tip of the glass preform to reduce the diameter thereof.

Generally, the glass preform is manufactured by using a small diameter seed rod as starting glass and depositing glass fine particles on an end portion of the glass preform to be vitrified. Therefore, the glass preform is diameter-reduced in a taper shape (also referred to as a tapered portion) from an upper end of a straight body portion (also referred to as a main body portion) to a boundary portion with the seed rod, is connected to a dummy rod having substantially a same diameter as the seed rod, and is hung in the furnace tube of the drawing furnace.

That is, since the glass preform has the tapered portion whose diameter varies greatly, it is very difficult to providing sealing at a position of the tapered portion, the seed rod or the dummy rod. Therefore, for example, Patent Document 1 discloses a technique for providing stable sealing to a glass preform. When the tapered portion comes close to a heating portion, a space volume in the drawing furnace becomes larger, so that gas flow inside the drawing furnace is changed and an outer diameter variation of the optical fiber becomes larger. Therefore, for example, Patent Document 2 discloses a technique for reducing fluctuation in gas flow in a drawing furnace.

However, although a sleeve member for sealing is provided on the dummy rod in Patent Document 1, as the drawing of the glass preform progresses, the space volume in the drawing furnace may increase when there is space around the tapered portion or the seed rod.

Patent Document 2 discloses a structure in which a cylindrical member is provided around a tapered portion or a seed rod. In this structure, however, space around the dummy rod portion may adversely affect the outer diameter variation when a diameter of the dummy rod is substantially the same as a diameter of the seed rod.

Accordingly, an aspect of the present disclosure provides a method for manufacturing an optical fiber, which can prevent an increase in a space volume in a drawing furnace as drawing of a glass preform progresses and can suppress an outer diameter variation of the optical fiber to be smaller.

Effect of the Disclosure

According to the present disclosure, the outer diameter variation of the optical fiber can be suppressed to be smaller.

Embodiments

First, contents of the embodiments of the present invention will be listed.

In a method for manufacturing an optical fiber according to an aspect of the present invention, (1) a dummy rod is connected to a vicinity of an upper end of a glass preform for optical fiber, the glass preform including a diameter-reduced portion at an upper portion thereof, and the glass preform for optical fiber is heated and melted in a drawing furnace to draw the optical fiber, wherein a cap member is provided at a position of the diameter-reduced portion of the glass preform for optical fiber, and an upper end of the cap member is disposed close to a lower end of the dummy rod, and when an orthogonal coordinate axis is set, in which an outer diameter ratio of the cap member to the glass preform for optical fiber is set as a horizontal axis x, and an outer diameter ratio of the dummy rod to the glass preform for optical fiber is set as a vertical axis y, the outer diameter ratio x of the cap member and the outer diameter ratio y of the dummy rod satisfy an expression $y \geq 0.1527 \times x^{-3.103}$.

Since space inside the drawing furnace is filled with the cap member and the dummy rod, a space volume inside the drawing furnace will not increase even when the diameter-reduced portion and the dummy rod reach the drawing furnace in this order. Thus, the outer diameter variation of the optical fiber can be suppressed to be smaller.

(2) The cap member is formed of at least one of carbon, ceramics, and quartz glass. When the cap member is formed of carbon, ceramics, or quartz glass having heat resistance, the cap member is less likely to be melt in the drawing furnace and is also less likely to be welded to the glass preform. (3) The cap member is configured to be dividable into an upper portion and a lower portion. When the cap member is configured to be dividable into the upper portion and the lower portion, the cap member reaches into the drawing furnace, and even when the lower portion melts, only the lower portion needs to be replaced and continued use of the upper portion is possible. Further, when a material having heat resistance higher than that of the upper portion is used in the lower portion, the lower portion is less likely to be melted.

Details of Embodiments

Hereinafter, a method for manufacturing an optical fiber according to preferred embodiments of the present invention will be described with reference to the accompanying drawings. Although a resistance furnace for heating a furnace tube by a heater will be described as an example in the following, the present invention is also applicable to an induction furnace in which a high frequency power source is applied to a coil and the furnace tube is inductively heated. Further, as for a method for connecting a glass preform to a dummy rod, the explanation below is an example and the present invention should not be limited thereto.

Figure 1:
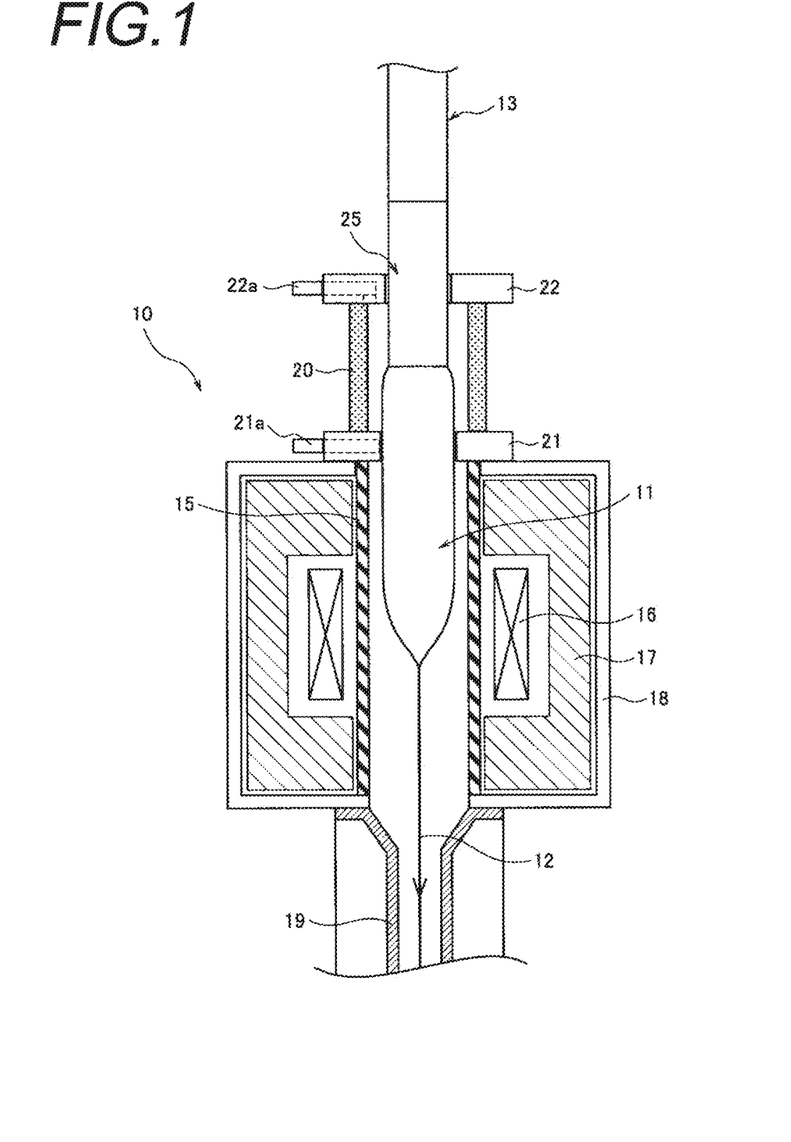
FIG. 1 is a diagram illustrating an overview of a method for manufacturing an optical fiber according to an embodiment of the present invention.
Figure 2:
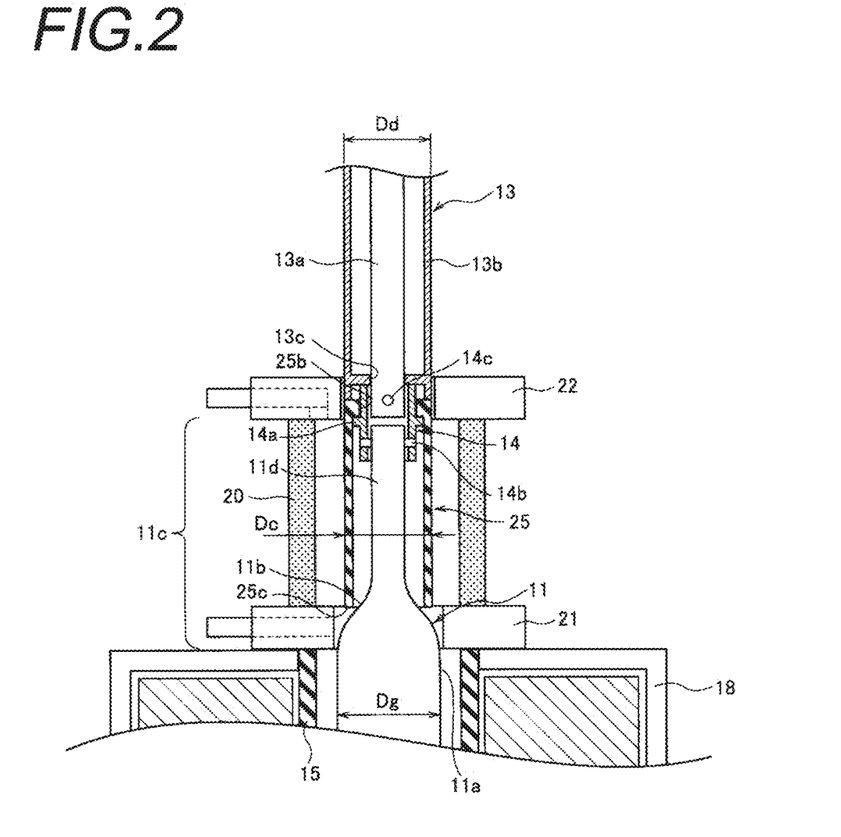
FIG. 2 is a diagram showing an example of a cap member and a dummy rod of FIG. 1, in which a vicinity of a diameter-reduced portion 11 c starts to pass through a first seal portion.

FIG. 1 is a diagram illustrating an overview of a method for manufacturing an optical fiber according to an embodiment of the present invention, and FIG. 2 is a diagram showing an example of a cap member and a dummy rod of FIG. 1, in which a vicinity of a diameter-reduced portion 11 c starts to pass through a first seal portion.

As shown in FIG. 1, a drawing furnace 10 includes, for example, a furnace housing 18, a lower chamber 19, and an upper chamber 20. A cylindrical furnace tube 15 formed of carbon is provided at a center portion of the furnace housing 18 and is in communication with the lower chamber 19 and the upper chamber 20.

The upper chamber 20 has, for example, a same inner diameter as the furnace tube 15, and a glass preform 11 is inserted from thereabove. An upper end of the glass preform 11 is connected to a later-described dummy rod 13 (also referred to as a support rod).

The upper chamber 20 is provided with a sealing mechanism for obtaining airtightness. Specifically, a first seal portion 21 is provided on an upper surface of the furnace housing 18 and can seal a gap with the glass preform 11. The first seal portion 21 is provided with a gas supply opening 21a for supplying, for example, inert gas such as argon gas into the furnace tube 15.

A second seal portion 22 having the same sealing function as the first seal portion 21 is provided on an upper end of the upper chamber 20. The second seal portion 22 is also provided with a gas supply opening 22a for supplying, for example, inert gas such as argon gas into the furnace tube 15.

While being sealed by the first and second seal portions 21 and 22, the glass preform 11 is hung in the furnace tube 15 and is lowered. In details, at the start of drawing, the first seal portion 21 seals a straight body portion 11 a of the glass preform 11 shown in FIG. 2.

Next, after a vicinity of the diameter-reduced portion 11 c of the glass preform 11 shown in FIG. 2 starts to pass through the first seal portion 21, the first seal portion 21 is switched with the second seal portion 22, and the second seal portion 22 seals an outer circumference surface of the dummy rod 13. Instead of the outer circumference surface of the dummy rod 13, an outer circumference surface of a later-described cap member 25 may be sealed.

In the second seal portion 22, a lid-shaped seal member may be mounted on the dummy rod, for example. When contacting the upper end of the upper chamber, the lid-shaped seal member would remain in the contracting position and functions as a lid closing the upper chamber. The outer circumference surface of the dummy rod is sealed with the gap of the hole for the dummy rod provided in the lid-shaped seal member.

In the furnace housing 18, a heater 16 is disposed so as to surround the furnace tube 15, and a heat insulating material 17 is housed so as to cover an outer side of the heater 16. The heater 16 heats to melt the glass preform 11 inserted in the furnace tube 15, and the melt and diameter-reduced optical fiber 12 is sagged from the lower chamber 19. The optical fiber drawn in the drawing furnace 10 is directed to a cooling device (not shown). Inert gas or the like fed into the drawing furnace passes through a gap between the glass preform 11 and the furnace tube 15, and then is discharged to the outside from a shutter portion or the like below the lower chamber 19.

As shown in FIG. 2, in the glass preform 11, a small-diameter seed rod 11d is used as starting glass, and a diameter-reduced portion 11c including a tapered portion 11b whose diameter is tapered and the small-diameter seed rod 11d is formed between a large-diameter straight body portion 11a of the glass preform 11 and a dummy rod body 13a (described later). The seed rod 11d is connected to the dummy rod body 13a using an adapter 14, for example.

As an example of the configuration of the adapter 14, the adapter 14 includes a substantially cylindrical adapter body 14a whose inner diameter is formed to be larger than an outer diameter of the seed rod 11d or the dummy rod body 13a. The seed rod 11d is inserted from below the adapter body 14a, and a first pin member 14b having a circular cross section is inserted at a predetermined position and fixed to the adapter body 14a. The dummy rod body 13a is inserted from below the adapter body 14a, and a second pin member 14c having a circular cross section is inserted and fixed at a predetermined position. The first pin member 14b and the second pin member 14c may be disposed not to be in parallel but to intersect each other. In the adapter 14, the dummy rod body 13a, the adapter body 14a, and the seed rod 11d may be integrally fixed by bolts, for example.

Herein, the cap member 25 is provided at a position of the diameter-reduced portion 11c of the glass preform 11. The cap member 25 is formed of, for example, quartz glass having heat resistance, and has a cylindrical shape provided with an insertion hole 25b through which the adapter body 14a is inserted at a center. An outer diameter of the cap member 25 is Dc, and an outer diameter of the straight body portion 11a of the glass preform 11 is Dg. The cap member 25 is lowered from above the adapter 14 such that the adapter body 14a is passed through the insertion hole 25b and is engaged with a protruding portion formed on an outer wall of the adapter body 14a, for example. Accordingly, a cap lower end 25c is disposed to be close to the diameter-reduced portion 11c.

The cap member may not have a cylindrical cross-sectional shape, and various shapes such as a substantially rectangular shape may be adopted. In a case where a self weight of the cap member is difficult to be applied to the glass preform such as a case where an upper end of the cap member is hung via a wire, the cap lower end may be in contact with the tapered portion. When the configuration is adopted where the cap member does not reach a temperature exceeding 1150° C. (determines a lower limit of a lowering position of the glass preform, so that the cap member does not get deeply into the drawing furnace, the inner diameter is made small, so that a position where the cap member contact the taper portion is made higher portion of the tapered portion, etc.,), the cap member may not be hung via the wire, or the cap lower end may be in contact with the tapered portion. Even in a case where the cap lower end exceeds 1150° C., for example, b a melt and deformed part may be replaceable and only a part of the cap member may be replaced. The cap member may not be formed of quartz glass, and may be formed of carbon materials or ceramics.

The dummy rod 13 may be, for example, a large-diameter dummy rod, or may be a configuration including the dummy rod body 13a formed of a glass rod having the same diameter as the seed rod 11d, and a sleeve member 13b provided around the dummy rod body 13a.

In a case of using the large-diameter dummy rod, the outer diameter is Dd as shown in FIG. 2. In this case, the dummy rod may be solid or hollow.

In a case of using the sleeve member, the sleeve member 13b is formed of heat resistant material, for example, metal, quartz glass, carbon materials, or SiC-coated carbon materials, and has a cylindrical shape provided with an insertion hole 13c through which the dummy rod body 13a is inserted at a center. In this case, the sleeve member 13b has an outer diameter Dd as shown in FIG. 2.

An upper end of the sleeve member 13b is hung, for example, via a wire, and is lowered from above the adapter 14, and an upper end of the adapter body 14a is brought into contact with a flat surface including the insertion hole 13c. Accordingly, a lower end of the sleeve member 13b is disposed close to the upper end of the cap member 25 in a state where a slight gap is provided, for example, at the upper end of the cap member 25.

Figure 3:
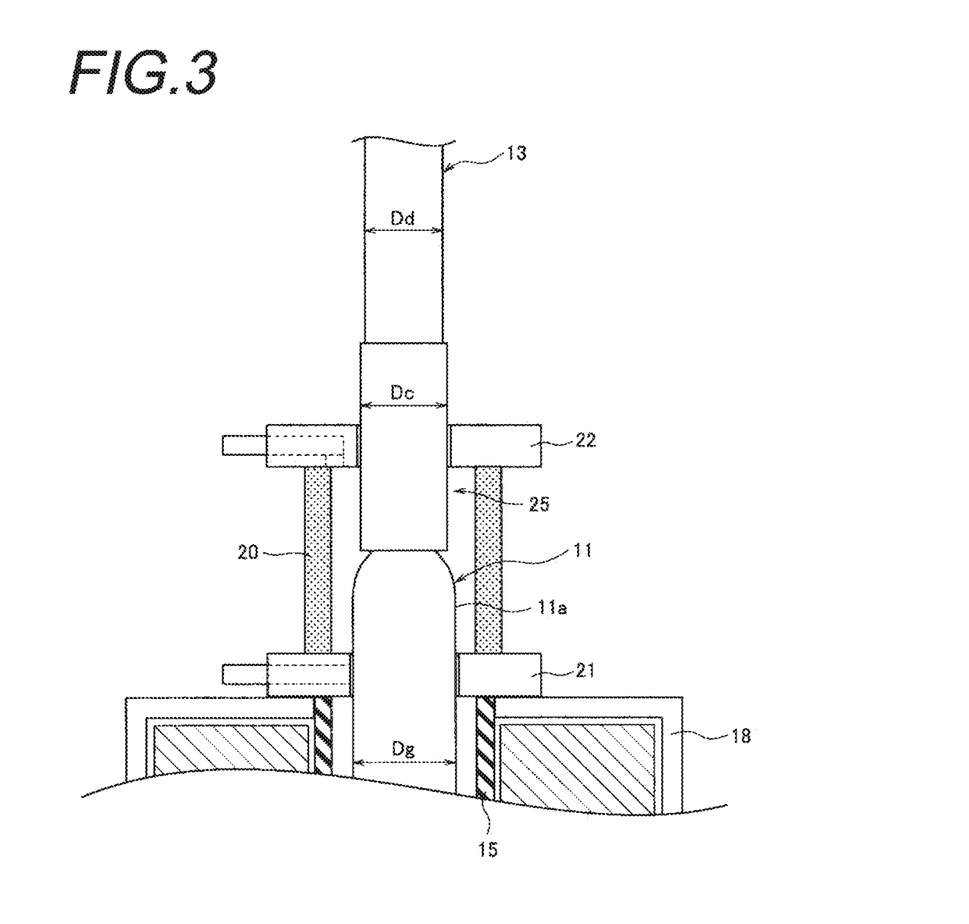
FIG. 3 is a diagram showing another example of a dummy rod.

FIG. 3 is a diagram showing another example of a dummy rod.

In the example of FIGS. 1 and 2, the outer diameter of the cap member 25 and the outer diameter of the dummy rod 13 (or the sleeve member 13b) are shown to be substantially equal. However, as shown in FIG. 3, the outer diameter Dc of the cap member 25 may be larger than the outer diameter Dd of the dummy rod 13. As in the example of FIG. 3, after the vicinity of the diameter-reduced portion of the glass preform 11 starts to pass through the first seal portion 21, the first seal portion 21 is switched with the second seal portion 22, and the second seal portion 22 seals the outer circumference surface of the dummy rod 13. Incidentally, the second seal portion 22 may seal the outer circumference surface of the cap member 25.

Figure 4A:
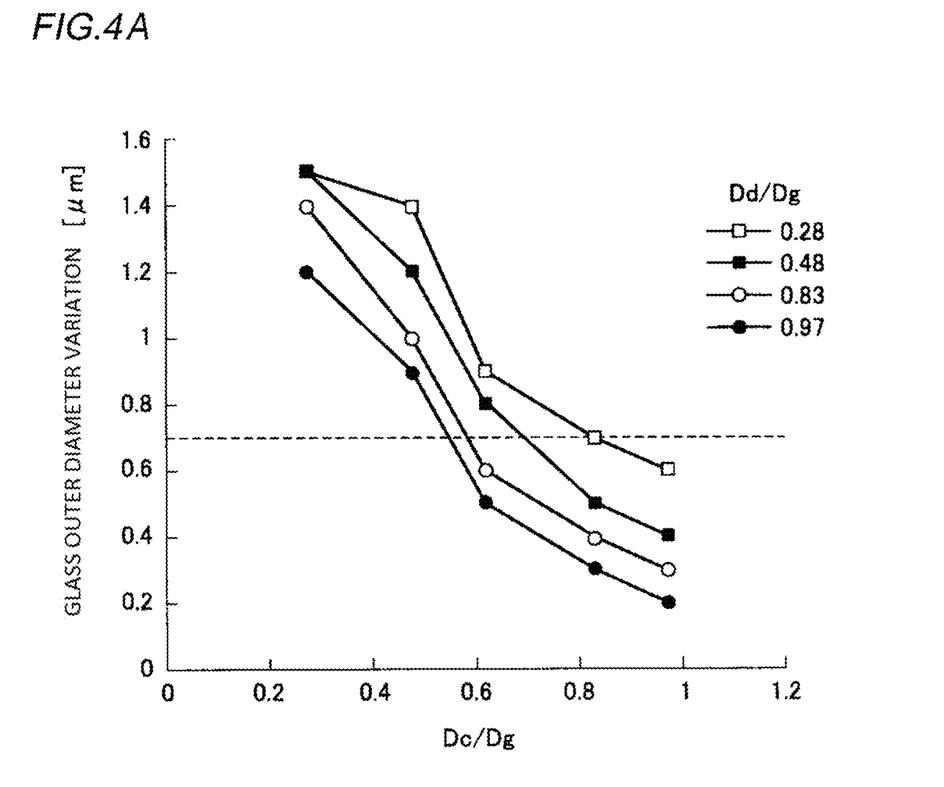
FIG. 4A is a graph showing a relationship of an outer diameter ratio of a cap member to a glass preform, an outer diameter ratio of a dummy rod to the glass preform, and a glass outer diameter variation.
Figure 4B:
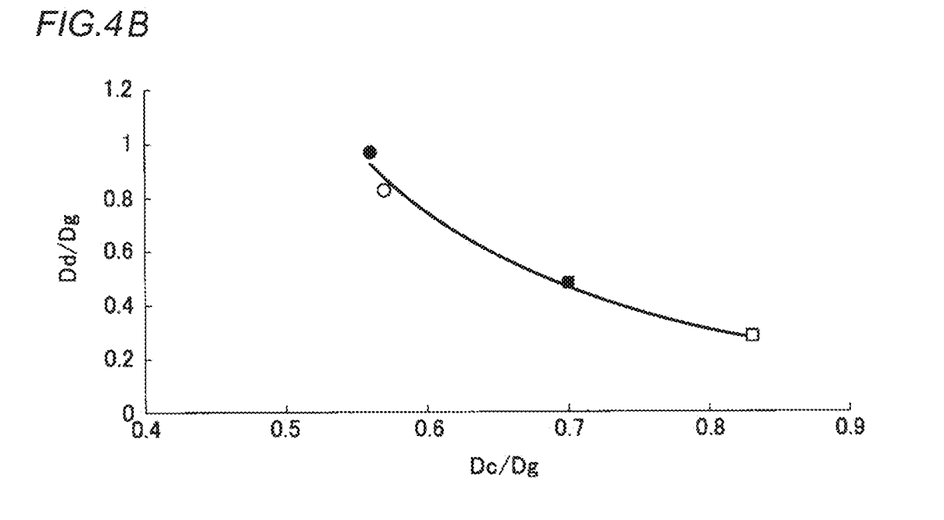
FIG. 4B is a graph showing points where the outer diameter variation is a specified value, on an orthogonal coordinate axis, in which an outer diameter ratio of the cap member to a straight body portion is set as a horizontal axis and an outer diameter ratio of the dummy rod to the straight body portion is set as a vertical axis, based on the result shown in FIG. 4A.

FIGS. 4A and 4B show a relationship of an outer diameter ratio of the cap member to the glass preform, an outer diameter ratio of the dummy rod to the glass preform, and a glass outer diameter variation.

Along with the lowering of the glass preform, the diameter-enlarged cap member and the diameter-enlarged dummy rod are also lowered and fill the space below a sealing position. Thus, the space volume inside the drawing furnace will not increase so much even when the diameter-reduced portion and the dummy rod reach a position below the sealing position in this order. Therefore, the outer diameter variation of the optical fiber can be suppressed to be smaller even near the end of drawing.

Specifically, the outer diameter variation of the optical fiber can be expressed by, for example, a value (3 σ) obtained by multiplying the variation (standard deviation σ) of the outer diameter of the optical fiber by three.

FIG. 4A is a graph of an orthogonal coordinate axis in which the outer diameter ratio (hereinafter referred to as Dc/Dg) of the cap member to the straight body portion is set as the horizontal axis, and the outer diameter variation of the optical fiber having a glass diameter of 125 μm is set as the vertical axis. As shown in FIG. 4A, in a case where the outer diameter ratio (hereinafter referred to as Dd/Dg) of the dummy rod to the straight body portion is 0.28 (denoted by □ in FIG. 4A), the outer diameter variation (3 σ) of the optical fiber near the end of drawing is ±0.7 μm or less, which conforms to the standard for a given single mode optical fiber, when the Dc/Dg is 0.83 or more.

Then, in a case where the Dd/Dg is 0.48 (denoted by ■ in FIG. 4A), the outer diameter variation (3 σ) of the optical fiber near the end of drawing is ±0.7 μm or less when the Dc/Dg is 0.7 or more.

Next, in a case where the Dd/Dg is 0.83 (denoted by ○ in FIG. 4A), the outer diameter variation (3 σ) of the optical fiber near the end of drawing is ±0.7 μm or less when the Dc/Dg is 0.57 or more. Further, in a case where the Dd/Dg is 0.97 (denoted by ● in FIG. 4A), the outer diameter variation (3 σ) of the optical fiber near the end of drawing is ±0.7 μm or less when the Dc/Dg is 0.56 or more.

FIG. 4B is a graph of an orthogonal coordinate axis, in which the Dc/Dg is set as the horizontal axis and the Dd/Dg is set as the vertical axis based on the above results.

In FIG. 4B, when a range in which the outer diameter variation (3 σ) of the optical fiber near the end of drawing is in a range off 0.7 μm or less, the point (0.7, 0.48) denoted by ■ in FIG. 4B, the point (0.83, 0.28) denoted by □ in FIG. 4B, the point (0.57, 0.83) denoted by ○ in FIG. 4B, and the point (0.56, 0.97) denoted by ● in FIG. 4B can be plotted as points of critical significance in the orthogonal coordinate axis. When these points are approximately connected, an exponential curve, $(Dd/Dg=0.1527\times(Dc/Dg)^{-3.103})$, is defined. Then, when the Dc/Dg and the Dd/Dg are set in a positive direction region including this curve, the outer diameter variation of the optical fiber can be suppressed to be smaller.

Figure 5:
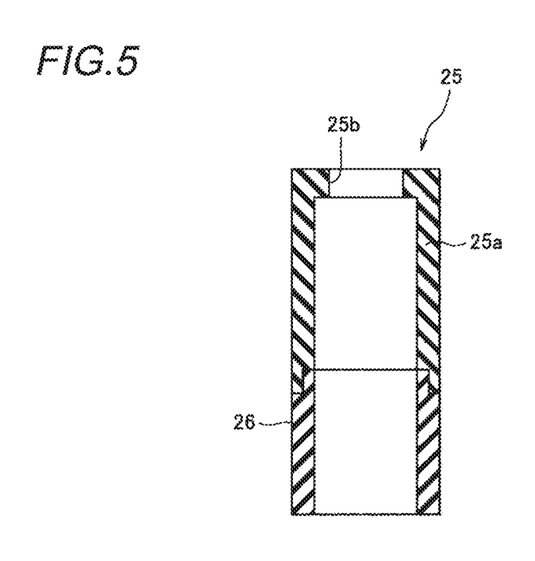
FIG. 5 is a diagram showing another example of a cap member.

FIG. 5 is a diagram showing another example of a cap member.

In the above example, the cap member is formed only of quartz glass. However, as shown in FIG. 5, the cap member can also be divided into an upper portion 25a provided at a position of the seed rod 11d and a lower portion 26 provided at a position of the tapered portion 11b, as shown in FIG. 2. In this case, a lower end of the upper portion 25a may be fitted to an upper end of the lower portion 26. The upper portion 25a and the lower portion 26 may be formed of the same material, and or a material (for example, carbon materials, ceramics) having heat resistance higher than that of the upper portion 25a (for example, quartz glass) may be used for the lower portion 26.

Accordingly, the lower portion 26 is not welded even contacting the tapered portion of the glass preform. Even when the lower portion 26 is welded, only the lower portion 26 is replaced, and the upper portion 25a can be continuously used.

It should be appreciated that the embodiments disclosed are illustrative in all respects and not restrictive. The scope of the present invention is defined not by the above-described meaning but by the following claims, and it is intended to include any changes within scope of claims and equivalent to claims.

DESCRIPTION OF REFERENCE NUMERALS

10 Drawing furnace
11 Glass preform
11a Straight body portion
11b Tapered portion
11c Diameter-reduced portion
11d Seed rod
12 Optical fiber
13 Dummy rod
13a Dummy rod body
13b Sleeve member
13c Insertion hole
14 Adapter
14a Adapter body
14b First pin member
14c Second pin member
15 Furnace tube
16 Heater
17 Heat insulating material
18 Furnace housing
19 Lower chamber
20 Upper chamber
21 First seal portion
21a, 22a Gas supply opening
22 Second seal portion
25 Cap member
25a Upper portion
25b Insertion hole
25c Cap lower end
26 Lower portion

The invention claimed is:

1. A method for manufacturing an optical fiber in which a dummy rod is connected to a vicinity of an upper end of a glass preform for the optical fiber, the glass preform including a diameter-reducing portion at an upper portion thereof, and the glass preform for optical fiber is heated to be melted in a drawing furnace to draw the optical fiber,
    wherein a cap member is provided at a position of the diameter-reducing portion of the glass preform for optical fiber, the cap member being engaged with an adapter that connects the dummy rod and the glass preform for optical fiber, and an upper end of the cap member being disposed to be in contact with a lower end of the dummy rod via the adapter, and
    wherein an outer diameter ratio ("x") of the cap member to the glass preform and an outer diameter ratio ("y") of the dummy rod to the glass preform satisfy an expression $y \geq 0.1527 \times x^{-3.103}$.

2. The method for manufacturing the optical fiber according to claim 1,
    wherein the cap member is formed of at least one of carbon, ceramics, and quartz glass.

3. The method for manufacturing the optical fiber according to claim 1,
    wherein the cap member is configured to be dividable into an upper portion and a lower portion.

* * * * *